United States Patent
Schlack (10) Patent No.: US 8,112,781 B2
(45) Date of Patent: Feb. 7, 2012

(54) CONTENT DELIVERY SYSTEM HAVING AN EDGE RESOURCE MANAGER PERFORMING BANDWIDTH RECLAMATION

(75) Inventor: John A. Schlack, Quakertown, PA (US)

(73) Assignee: General Instrument Corporation, Horsham, PA (US)

( * ) Notice: Subject to any disclaimer, the term of this patent is extended or adjusted under 35 U.S.C. 154(b) by 614 days.

(21) Appl. No.: 12/246,558

(22) Filed: Oct. 7, 2008

(65) Prior Publication Data

US 2010/0086020 A1   Apr. 8, 2010

(51) Int. Cl.
*H04N 7/173* (2011.01)

(52) U.S. Cl. ......... 725/95; 725/96; 725/97; 370/395.41; 370/468; 370/477

(58) Field of Classification Search ............... 725/95–97; 370/395.41, 468, 477, 385.41
See application file for complete search history.

(56) References Cited

U.S. PATENT DOCUMENTS

| | | | |
|---|---|---|---|
| 6,738,816 B1* | 5/2004 | Momona | 709/226 |
| 6,909,726 B1* | 6/2005 | Sheeran | 370/468 |
| 6,986,156 B1* | 1/2006 | Rodriguez et al. | 725/95 |
| 2003/0182429 A1 | 9/2003 | Jagels | |
| 2005/0071882 A1* | 3/2005 | Rodriguez et al. | 725/95 |
| 2006/0095945 A1* | 5/2006 | Carpenter et al. | 725/87 |
| 2006/0218601 A1* | 9/2006 | Michel | 725/87 |
| 2006/0236358 A1 | 10/2006 | Liu et al. | |
| 2007/0033282 A1* | 2/2007 | Mao et al. | 709/226 |
| 2007/0076728 A1 | 4/2007 | Rieger et al. | |
| 2007/0083899 A1* | 4/2007 | Compton et al. | 725/87 |
| 2007/0143457 A1* | 6/2007 | Mao et al. | 709/223 |
| 2007/0204300 A1* | 8/2007 | Markley et al. | 725/46 |
| 2008/0201748 A1* | 8/2008 | Hasek et al. | 725/98 |
| 2008/0229379 A1* | 9/2008 | Akhter | 725/139 |
| 2009/0025027 A1* | 1/2009 | Craner | 725/32 |

* cited by examiner

*Primary Examiner* — Pankaj Kumar
*Assistant Examiner* — Mulugeta Mengesha
(74) *Attorney, Agent, or Firm* — Brian G. Brannon (57) ABSTRACT

A method is provided for reclaiming bandwidth from an edge device. The method includes communicating a bandwidth query message to at least one session manager. The bandwidth query message specifies an amount of bandwidth that needs to be reclaimed from a single one of a plurality of edge devices in order to establish at least one additional session that delivers a digital service to a subscriber in a service group serviced by the plurality of edge devices over an access network. In response to communication of the bandwidth query message, a bandwidth query response message is received from the session manager identifying an edge device from which at least the specified amount of bandwidth can be reclaimed. A response is communicated to the session manager requesting the session manager to reclaim the specified amount of bandwidth from the edge device that has been identified.

20 Claims, 6 Drawing Sheets

CONTENT DELIVERY SYSTEM HAVING AN EDGE RESOURCE MANAGER PERFORMING BANDWIDTH RECLAMATION

FIELD OF THE INVENTION

The present invention relates generally to a content delivery system for distributing content to a subscriber over a system such as a satellite or cable television system, and more particularly to a content delivery system that includes multiple edge device resources delivering digital services such as switched digital video (SDV) and video on demand (VOD) to the subscriber, which resources need to be reallocated when their available bandwidth becomes limited.

BACKGROUND OF THE INVENTION

With recent advances in digital transmission technology, subscriber television systems are now capable of providing much more than traditional analog broadcast video. In implementing enhanced programming, the subscriber terminal, such as a set top box or terminal, has become an important computing device for accessing media content services (and media content within those services) and for navigating a user through a maze of available services. In addition to supporting traditional analog broadcast video functionality, digital subscriber terminals now also support an increasing number of two-way or interactive digital services such as video-on-demand (VOD), switched digital video (SDV), high-definition (HD) broadcast, high-speed data, VoIP, Interactive TV, and the like.

One way to support two way digital services such as those mentioned above is to utilize a session manager for each different service that is available. The session managers will negotiate with the edge devices (e.g., a digital modulator such as a QAM modulator) to allocate resources required for the sessions that will deliver their respective digital services. The edge devices need to dynamically allocate network resources (e.g., bandwidth) in order to establish the sessions with the subscribers, typically over an access network. Originally, the network and edge devices were typically "hardwired" or associated with a specific digital service. That is, each edge devices was dedicated to a particular digital service.

One significant competitive challenge that network operators face on an ongoing basis relates to managing and conserving bandwidth. This includes the reclamation of otherwise under-utilized or unused bandwidth such that the service and/or customer base can be expanded without significant modifications or build-outs of the underlying network infrastructure. In this respect an arrangement in which edge devices are associated with a specific digital service is often unsatisfactory. For instance, if a particular digital service is not popular or has a varying degree of popularity during the course of a day or week, some of the edge device resources will be wasted since they can only support that particular service. Additionally, during times of peak demand, the network may not have enough edge device resources available, causing a service delivery failure.

To overcome this problem an edge resource manager has recently been introduced, which allows edge device resources to be shared among different digital services. This arrangement allows the network to better manage variations in service popularity. If usage of one service spikes, the edge resource manager can pool resources from other edge devices currently assigned to less popular services to handle the spikes. Despite this improvement resulting from the use of the edge resource manager, network operators continue to focus on techniques for utilizing as efficiently as possible the full capacity of their existing networks.

SUMMARY

In accordance with the invention, a method is provided for reclaiming bandwidth from an edge device. The method includes communicating a bandwidth query message to at least one session manager. The bandwidth query message specifies an amount of bandwidth that needs to be reclaimed from a single one of a plurality of edge devices in order to establish at least one additional session that delivers a digital service to a subscriber in a service group serviced by the plurality of edge devices over an access network. In response to communication of the bandwidth query message, a bandwidth query response message is received from the session manager identifying an edge device from which at least the specified amount of bandwidth can be reclaimed. A response is communicated to the session manager requesting the session manager to reclaim the specified amount of bandwidth from the edge device that has been identified.

In accordance with one aspect of the invention, the bandwidth query response message may identify a number of active sessions currently being delivered to the service group that need to be relocated from one or more of the edge devices to another edge device in order to reclaim the specified amount of bandwidth from the edge device that has been identified.

In accordance with another aspect of the invention, the bandwidth query response message may identify a number of active sessions that can be released to thereby reclaim all bandwidth from each session.

In accordance with another aspect of the invention, at least one session manager may include a plurality of session managers each associated with a different digital service. A bandwidth query message is communicated to each of the session managers. A bandwidth query response is received from each of the session managers. At least two of the bandwidth query messages indicate that the specified amount of bandwidth can be reclaimed from an edge device. One of the session managers is selected in accordance with a predefined policy. A response is communicated to the selected session manager requesting the selected session manager to reclaim the specified amount of bandwidth from the edge device that has been identified by the selected session manager.

In accordance with another aspect of the invention, one of the session managers may select a plurality of session managers in accordance with the predefined policy and communicates a response to the plurality of selected session managers requesting the selected session managers to reclaim the specified amount of bandwidth from a common edge device that has been identified by each of the selected session managers.

In accordance with another aspect of the invention, the predefined policy may require selecting a session manager that needs to relocate a fewest number of active sessions in order to reclaim the specified amount of bandwidth.

In accordance with another aspect of the invention, the predefined policy may be based on service or subscriber type.

In accordance with another aspect of the invention, the bandwidth query message may include an identification of an amount of currently available bandwidth on each of the plurality of edge devices.

In accordance with another aspect of the invention, the bandwidth query message may be generated and communicated in response to a session setup request received from a session manager.

In accordance with another aspect of the invention, a content delivery system includes at least one session manager for coordinating delivery of a digital service to subscriber terminals and a plurality of edge devices for delivering the digital service over an access network to subscriber terminals in a service group. The system also includes an edge resource manager for allocating bandwidth offered by the edge devices for establishment of sessions in which the digital service is delivered to individual ones of the subscribers by one of the edge devices. The edge resource manager is requested to establish the sessions by the session manager. The edge resource manager and the session manager are configured to communicate with one another in order to defragment the bandwidth offered by the edge devices so that at least one single block of bandwidth is made available on a single one of the edge devices for the purpose of establishing at least one additional session.

In accordance with another aspect of the invention, at least one of the edge devices may be a QAM modulator.

In accordance with another aspect of the invention, the edge resource manager may be configured to generate a bandwidth query message that is communicated to the session manager. The bandwidth query message specifies an amount of bandwidth that needs to be reclaimed from a single one of a plurality of edge devices in order to establish the at least one additional session.

In accordance with another aspect of the invention, the session manager may be configured to generate a bandwidth query response message in response to receipt of the bandwidth query message. The bandwidth query response message identifies an edge device from which at least the specified amount of bandwidth can be reclaimed.

In accordance with another aspect of the invention, at least one session manager may include a plurality of session managers each associated with a different digital service. The edge resource manager is further configured to identify, from a bandwidth query response message received from each of the plurality of session managers, one or more of the session managers from which the specified amount of bandwidth is to be reclaimed.

In accordance with another aspect of the invention, the edge resource manager may be configured to identify one or more of the session managers from which the specified amount of bandwidth is to be reclaimed in accordance with a policy that requires a fewest number of active session to be relocated from one edge device to another edge device.

DETAILED DESCRIPTION

Figure 1:
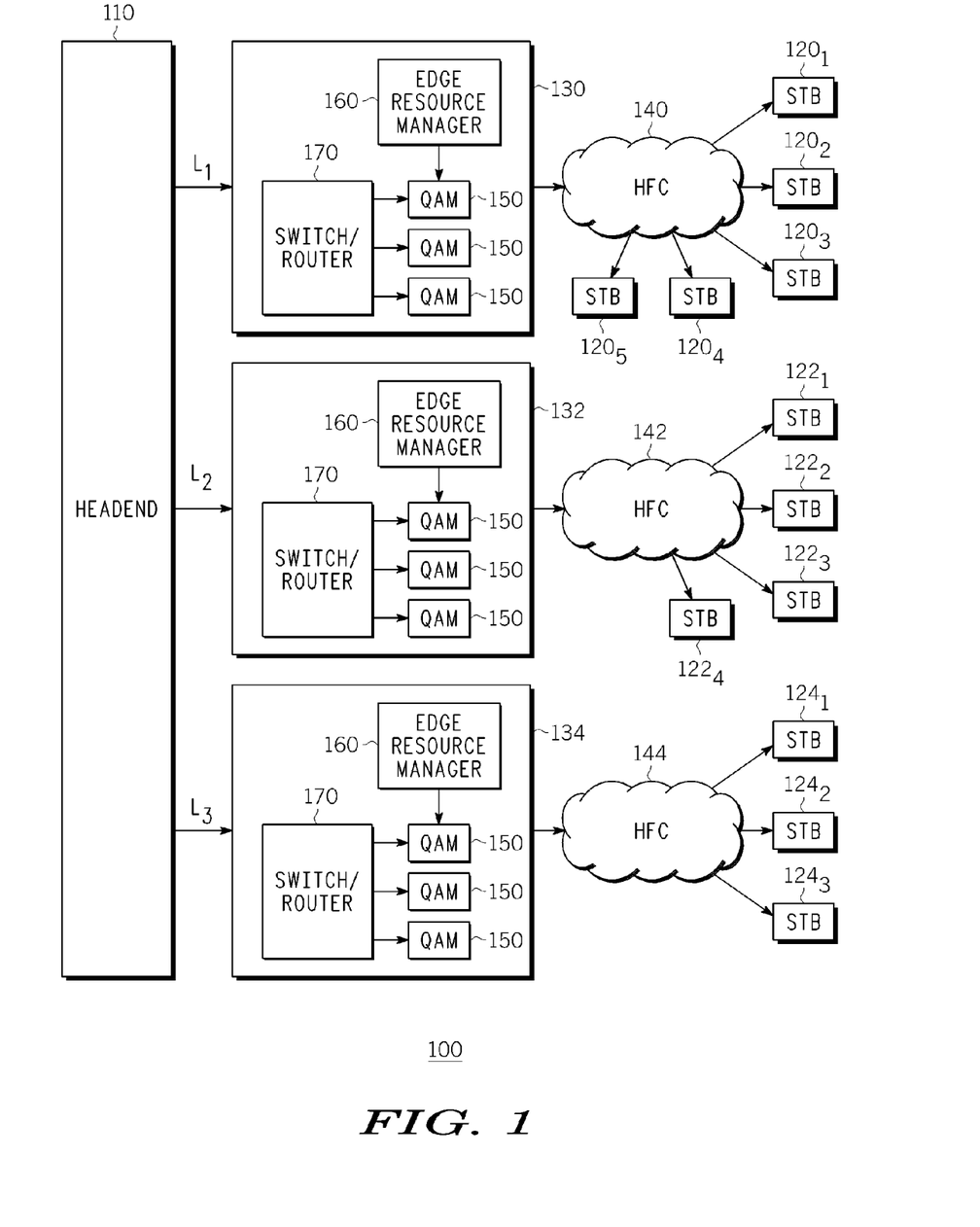
FIG. 1 shows one example of a content delivery system for delivering digital services to subscribers.

FIG. 1 shows a content delivery system architecture 100 for delivering digital services or sessions to subscribers. Such digital services may include, by way of example, switched digital video (SDV), video on demand (VOD) and Internet Protocol (IP) traffic services, using, for instance, a DOCSIS protocol. Switched digital video (SDV) refers to an arrangement in which broadcast channels are only switched onto the network when they are requested by one or more subscribers, thereby allowing system operators to save bandwidth over their distribution network. Video on demand (VOD) refers to an arrangement in which stored programs or other content are distributed to subscribers on an on-demand basis. Among other components, system architecture 100 comprises a content distribution source such as a headend 110 that is connected to multiple intermediate entities such as hubs 130, 132, and 134. The headend 110 communicates with a switch or router 170 in hubs 130, 132 and 134 over links L1, L2 and L3, respectively. The headend 110 and hubs 130, 132, and 134 may communicate over a packet-switched network such as a cable data network, passive optical network (PON) or the like using, for example, IP multicast addressing.

Some or even all of the hubs are connected to multiple users, typically via distribution networks such as local cable access networks (e.g., HFC networks). For simplicity of explanation only, each hub is shown as being connected to a distinct HFC network, which in turn communicates with end user equipment as illustrated. In particular hubs 130, 132 and 134 in FIG. 1 communicate with access networks 140, 142 and 144, respectively. Each access network 140, 142 and 144 in turn communicates with multiple end user devices such as set top or subscriber terminals. In the example of FIG. 1, access network 140 communicates with set top terminals $120_1$, $120_2$, $120_3$, $120_4$ and $120_5$, access network 142 communicates with set top terminals $122_1$, $122_2$, $122_3$ and $124_4$, and access network 144 communicates with set top terminals $124_1$, $124_2$ and $124_3$.

In addition to the switch or router 170, each hub can include an array of radio frequency transmitter edge devices such as edge QAM modulators 150. The number of edge devices 150 in each hub may vary as needs dictate. As used herein, the term "QAM" refers to modulation schemes used for sending signals over cable access networks. Such modulation schemes might use any constellation level (e.g. QAM-16, QAM-64, QAM-256 etc.) depending on the details of a cable access network. A QAM may also refer to a physical channel modulated according to such schemes. Typically, a single QAM modulator can output a multiplex of ten or twelve programs, although the actual number will be dictated by a number of factors, including the communication standard that is employed. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users, over the HFC network. Each transport stream is mapped to a downstream QAM channel. Each QAM channel has a carrier frequency that differs from the carrier frequency of the other channels. The transport streams are mapped according to a channel plan designed by the MSO that operates the network. Currently, each QAM can typically support 38.8 Mbps of downstream bandwidth.

It should be noted that the precise type of edge device that is employed will vary depending on the type of access network that is employed. In fact, the edge devices sometimes overlap with or extend into the access network. For instance, a fiber access network can include an optical line terminal (OLT), an optical node terminal (ONT), and devices inside the home. Therefore, the OLT and the ONT may be considered either an edge device or an access network device. However, the ONT may at times be considered a customer premises device. On the other hand, as noted above, a hybrid fiber/coax (HFC) network typically uses modulator edge devices. A digital subscriber line (DSL) network can include a digital subscriber line access multiplexer (DSLAM), with DSL modems usually located in the customer premises. Thus, OLTs, modulators, and DSLAMs are all sometimes referred to as edge devices since they service numerous user homes, such as a neighborhood in a city.

Each hub 130, 132 and 134 also includes an edge resource manager 160 for allocating and managing the resources of the edge devices 150. In particular, the edge resource manager 160 handles the allocation of bandwidth and the MPEG program number on each of the edge devices 150. In this ways the edge resource manager 160 determines the edge device resources (e.g., bandwidth) are needed by each service or session that is to be established. The edge resource manager 160 communicates with and receives instructions from the session manager(s) located in the headend 110, which will be discussed below.

The set top terminals are generally arranged into service groups and each of the service groups is assigned to, and serviced by, one or more QAM modulators. For example, in the arrangement depicted in FIG. 1 set top terminals $120_1$, $120_2$, $120_3$, $120_4$ and $120_5$ are assigned to QAM modulators 150 located at hub 130, set top terminals $122_1$, $122_2$, $122_3$ and $122_4$ are assigned to QAM modulators 150 located at hub 132, and set top terminals $124_1$, $124_2$ and $124_3$ are assigned to QAM modulators 150 located at hub 134. Typically, four (4) or eight (8) QAM modulators are deployed per service group to carry the digital services. Service groups currently include from about 500 to 1000 set top terminals. Depending on the system topology, there may or may not be a one-to-one correspondence between the hubs and the service groups. For instance, it is typically the case that each hub serves multiple service groups.

Figure 2:
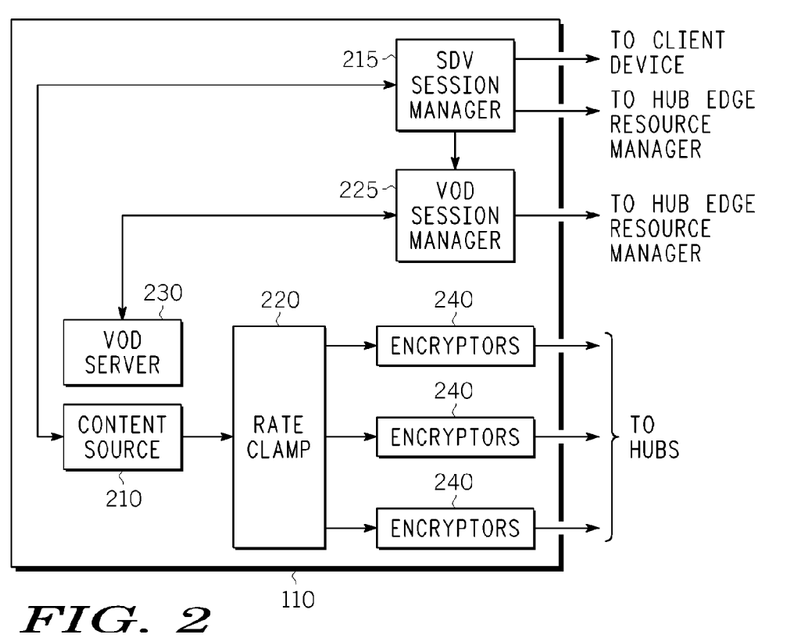
FIG. 2 shows one example of the headend depicted in FIG. 1.

FIG. 2 shows one example of headend 110. The headend 110 includes a session manager for each digital service that is offered. In the example shown in FIG. 2, the digital services being offered include SDV and VOD. Accordingly, the headend 110 includes a SDV session manager 215 and a VOD session manager 225. Of course, as previously mentioned, other digital services may be offered as well, in which case corresponding session managers will be employed in the headend. the session managers set up their respective services, receive requests for such services from subscribers and communicates with the edge resource managers 160 in the hubs so that the services can be switched on and off under the control of the session manager.

For instance, in the case of an SDV service, the SDV session manager 215 is used to determine which SDV transport streams are being transmitted at any time and for directing the set top terminals to the appropriate stream. The SDV manager 215 also keeps track of which subscribers are watching which channels. In addition, all subscriber requests for a switched digital channel go through the SDV manager 215. Under control of the SDV manager 215, content from a content source 210 (e.g., satellite receivers, off-air receivers, content storage devices) is forwarded to a rate clamp 220 and one or more encryptors 240 using, for example, IP multicast addressing. The content is then encrypted by the encryptors 240 and transmitted to the appropriate hub or hubs. Typically, standard definition (SD) channels are currently rate clamped to 3.75 Mbps while high definition channels are currently rate clamped to between about 15 Mbps and 19 Mbps. The encryptors 240 encrypt the digitally encoded content, often under the control of a conditional access system (not shown). The VOD session manager 225 operates in a similar manner to the SDV manager 215, except that VOD session manager 225 forwards to the rate clamp 220 content stored in a VOD server 230.

The edge devices 150 provide the services or sessions to the set top terminals using the downstream in-band channels. To communicate control information and the like to the headend 110 and/or the relevant hub, however, the set top terminals may use out-of-band (OOB) or DOCSIS channels or an IP tunnel or an IP connection and associated protocols. Alternatively, in some cases communication of control information and the like can be performed using in-band channels as well. The control information that is communicated by the set top terminals to the session managers over the control channels includes subscriber requests and the like. In this way each session manager is aware of the status of any of its services that are being delivered to each set top terminal at any given time. For instance, in the case of the SDV session manager 215, SDV channel change messages are used to communicate configuration information between the set top terminals and the SDV session manager 215. Each time a set top terminal requests an SDV program such a channel change message is sent to the SDV session manager 215 by the set top terminal.

It should be noted that the distribution of components between the headend and the hubs that is shown in FIGS. 1 and 2 is presented by way of illustration only. In general, the distribution of these components may vary from system architecture to system architecture. For instance, some or all of the functionality the session managers 215 and 225 may be transferred from the headend 110 to each of the hubs 130, 132 and 134. Likewise, some or all of the functionality of the edge resource managers 160 may be transferred from the hubs to the headend.

Headend 110 may also include a variety of other components. For example, the head-end 110 may comprise typical head-end components and services including a billing module, an advertising insertion module, a subscriber management system (SMS), a conditional access system and a LAN(s) for placing the various components in data communication with one another. If data services are being supplied by headend, a modulator or integrated Cable Modem Termination System (CMTS) may also be provided. It will also be appreciated that the head-end configuration depicted in FIG. 2 is a high-level, conceptual architecture and that each network may have multiple head-ends deployed using different architectures.

As previously mentioned, the edge resource manager 160 handles the allocation of bandwidth among the edge devices 150 it serves. In general the edge resource manager 160 attempts to maximize the number of sessions that can be supported by its edge devices 150 so that all service requests can be handled. However, as the edge devices 150 become loaded with traffic and their available bandwidth reduced, the service usage pattern may reduce the available bandwidth on each edge device to point where a new session cannot be setup, even if the available bandwidth across all the edge devices serving a particular service group would support the new session.

Figure 3:
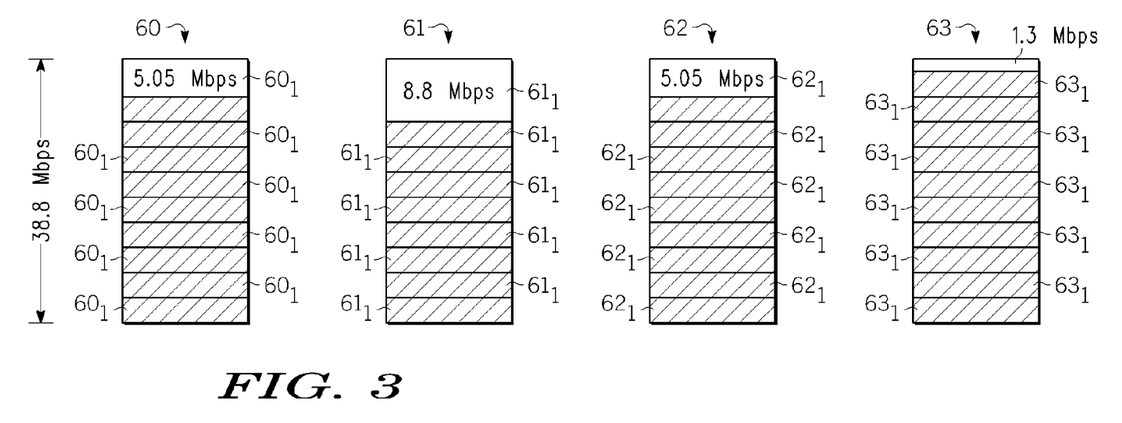
FIG. 3 shows the allocation of bandwidth among four edge devices under the control of a single edge resource manager.

FIG. 3 shows an example of how the edge resource manager can allocate bandwidth among four edge devices 60-63 under its control. The total bit rate that can be supported by each edge device in this example is 38.8 Mbps. Each bandwidth portion $60_1$-$63_1$ represents an allocation of bandwidth to a different session. The hatched portions of each edge device's bandwidth allocation represent sessions that are currently bound to that edge device, and thus represent unavailable bandwidth. The unhatched portions of each bandwidth allocation represent unused bandwidth that is available when a new session is to be established. That is, the four edges devices represented in FIG. 3 have 5.5, 8.8, 5.05 and 1.3 Mbps of available bandwidth, respectively. Thus, the total available bandwidth across all the edge devices 60-63 serving this particular service group is 20.2 Mbps. Although this total available bandwidth is sufficient to support an MPEG-2 HD program, which requires between 15 and 19 Mbps, no single edge device has sufficient bandwidth to support the setup of a new MPEG-2 HD session. The total available bandwidth could be used to support the new MPEG-2HD session if the bandwidth is "defragmented" by removing or relocating some currently bound sessions so that all of the unused bandwidth is made available on a single edge device.

In some cases it may be possible to remove or relocate some of the bound sessions without impacting subscribers so that small blocks or fragments of unused bandwidth can be concatenated as a single block on one edge device. For example, the SDV session manager may be aware of one or more SDV channels that are currently being delivered but which are not currently being watched by any subscribers. Likewise, a CMTS may be able to release a downstream QAM with little or no impact to the data rate assigned to subscribers using high speed data services. In addition, the VOD server may be delivering menus or the like using high bit-rate mosaics which can be replaced by traditional text based menus to conserve bandwidth.

Figure 4:
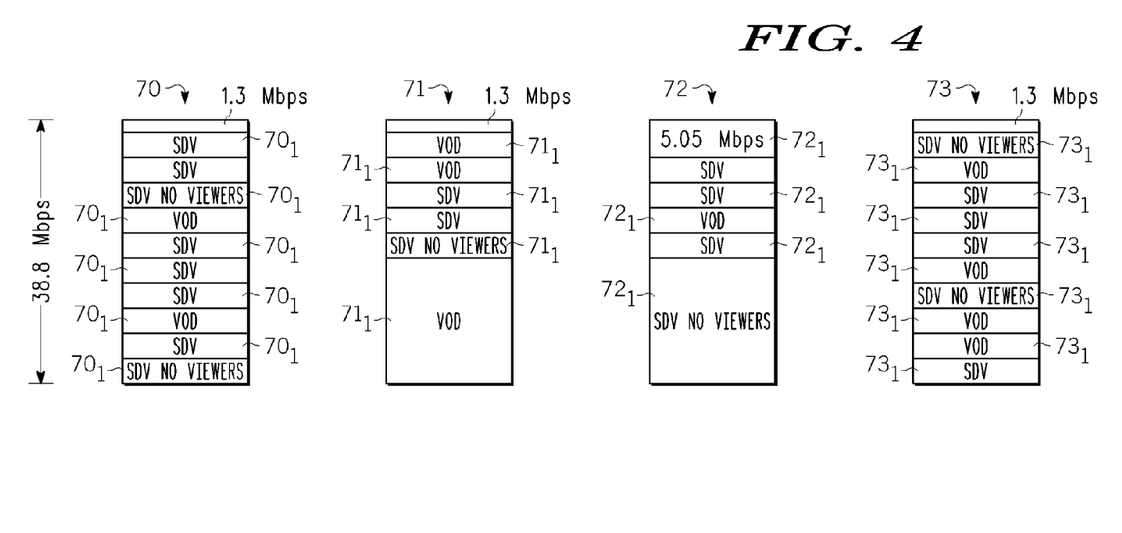
FIG. 4 shows the allocation of bandwidth among different sessions being delivered by each of the four edge devices shown in FIG. 3.

An example of how sessions may be reallocated is shown in FIG. 4 for four edge devices 70-73. As in FIG. 3, each bandwidth portion $70_1$-$73_3$ represents a different service supported by the edge devices 70-73, respectively. In this example there are a total of six SDV sessions that currently have no viewers and thus the bandwidth allocated to these sessions can be reallocated to new sessions. Enough bandwidth may be recovered in this manner so that no defragmentation or reallocation of bandwidth among the individual edge devices is necessary. Of course, if such reallocation were necessary, the edge resource manager would not be able to determine how the currently bound sessions should be moved among the edge devices. This is because the only information directly available to the edge resource manager is the information received from the session managers with which it is in communication. This information includes the identity of the session managers that have requested resources and the bandwidth that each such session manager is using on each edge device. The edge resource manager is limited in this manner because, as previously noted, the edge resource manager does not directly communicate with the set top terminals and therefore does not know the actual status of the sessions it is delivering to the subscribers. Only the session managers, which are in communication with the set top terminals through one or more control channels, know the current status of the various sessions. For instance, in reference to FIG. 4, the edge resource manager does not know which SDV sessions are and are not currently being watched. This information is only available to the SDV session manager. Accordingly, if the edge resource manager is to reallocate sessions in order to reclaim large blocks of bandwidth, it can only do so after communicating with the session managers.

Figure 5:
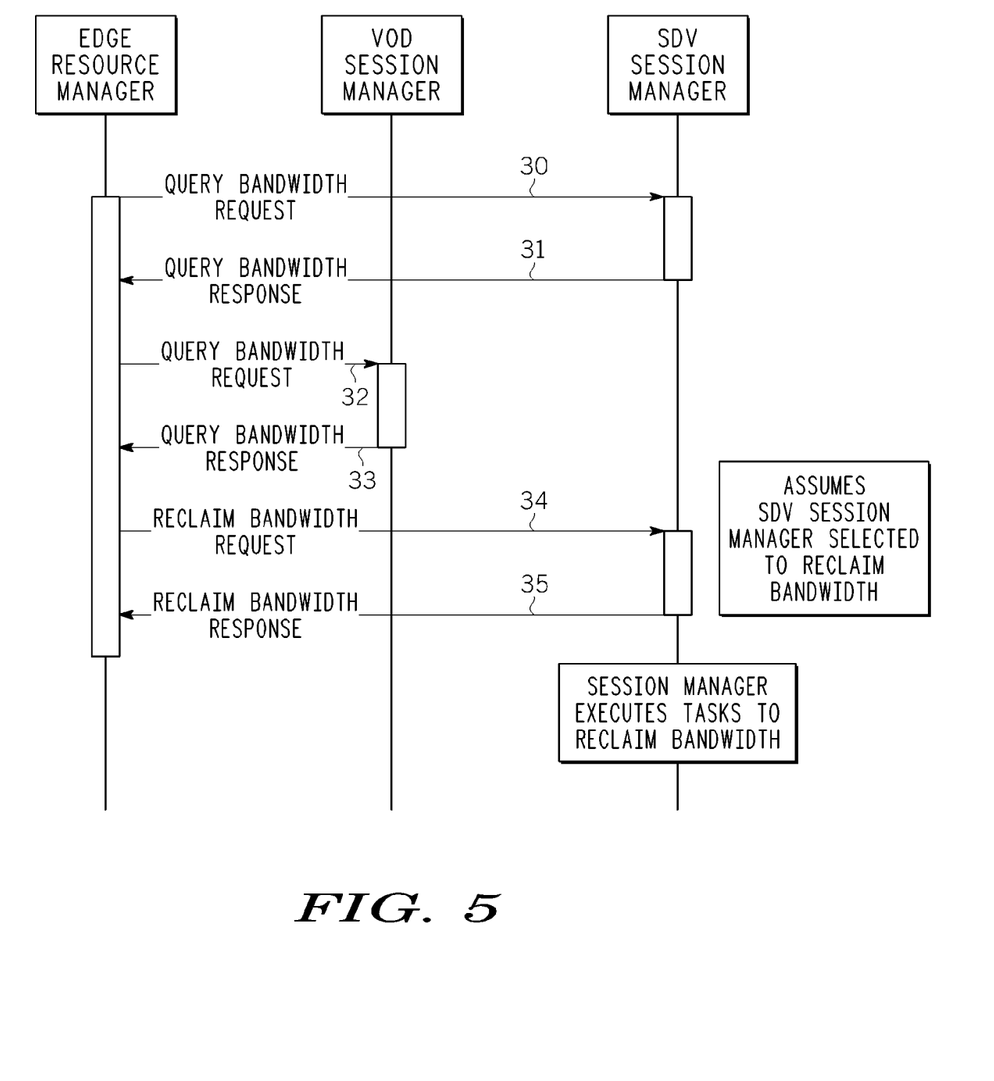
FIG. 5 shows a message flow diagram illustrating a sequence of messages that may be communicated between the edge resource manager and the session managers in order to reallocate bandwidth among the edge devices under the control of the edge resource manager.

FIG. 5 is a message flow diagram illustrating a sequence of messages that may be communicated between the edge resource manager and the session managers in order to reallocate bandwidth among the edge devices under the control of the edge resource manager. For simplicity of illustration, in this example only SDV and VOD sessions are being allocated. Of course, the message sequence may be extended to other types of sessions and services as well. Additionally, the edge resource manager is assumed to be attempting to make available a block of bandwidth that can support the highest possible bandwidth service, which is the delivery of a MPEG-2 HD program requiring up to 19 Mbps.

Referring now to FIG. 5, the message flow sequence begins at 30 when the edge resource manager sends a Query Bandwidth Request to one of the session managers, which in this case is the SDV session manager. The request includes the amount of bandwidth that needs to be reclaimed on a given edge device to support a new MPEG-2 HD session. The Query Bandwidth Request may also include the amount of free bandwidth currently available on each of the edge devices. In this way the session manager can determine if it is able to move a session from one edge device to another in order to satisfy the bandwidth request.

In response to the Query Bandwidth Request, the SDV session manager executes an optimization algorithm that examines every edge device specified by the edge resource manager to determine if any sessions can be released, degraded, or moved to another edge device to reclaim the requested bandwidth. A session is degraded when the service associated with the session continues to be delivered, albeit by using less bandwidth. For instance, a VOD or SDV session can be degraded to save bandwidth by reducing the resolution of the video that is provided to the subscriber(s). The results of the SDV session manager's determination is provided to the edge resource manager in a Query Bandwidth Response, indicated at 31 in FIG. 5. If the SDV session manager cannot reclaim enough bandwidth on any one edge device in the service group, the Query Bandwidth Response sent to the edge resource manager indicates that it cannot satisfy the request. However, if the SDV session manager can satisfy the request, it selects the set of actions that reclaim the requested bandwidth yet impact the fewest number of existing sessions. In this case the Query Bandwidth Response includes the identification of the edge device from which the bandwidth can be reclaimed, the amount of bandwidth that will be released on that edge device, and the number of sessions that must be relocated to different edge devices.

Next, as indicated at 32, a second Query Bandwidth Request is sent by the edge resource manager to another session manager, which in this case is the VOD session manager. The request may include the same information that was provided in the Query Bandwidth Request that was sent to the SDV session manager. Similarly, at 33, the VOD session manager determines if the request can be fulfilled and sends a Query Bandwidth Response back to the ERM.

When the edge resource manager receives the Query Bandwidth Response messages from each of the different session managers, it selects the session manager that needs to relocate the fewest number of sessions. The edge resource manager sends a Reclaim Bandwidth Request back to this selected session manager at 34 to direct the session manager to execute the actions needed to reclaim bandwidth. In this example the session manager that is selected is the SDV session manager. The SDV session manager returns a Reclaim Bandwidth response or acknowledgement at 35 and then executes the actions required to reclaim the bandwidth on the edge device it identified in its Query Bandwidth Response.

Note that if the bandwidth reclamation process is initiated by the edge resource manager reactively in response to a new session setup request, the edge resource manager must wait for the session manager to execute the actions required to reclaim the bandwidth before it can complete the setup process for the new session. Also, if the edge resource manager initiates the bandwidth reclamation process reactively it will generally request whatever amount of bandwidth is needed to satisfy the request. On the other hand, if the edge resource manager initiates the bandwidth reclamation process proactively (i.e., not in direct response to a new session setup request), then as in this example the edge resource manager may request a block of bandwidth that can support the highest possible bandwidth session that may be requested (e.g., a MPEG-2 HD program requiring up to 19 Mbps).

In the message flow sequence presented in FIG. 5 the two session managers were queried in sequence, one after the other. This two step process may be used in order to prevent conflicts that could arise if two session managers attempt to relocate sessions at the same time. More generally, however, the session managers may be queried sequentially as in this example or, alternatively, in parallel with one another.

Communication between the session managers and the edge resource manager may be accomplished using any suitable protocol. For instance, the RTSP protocol and the DSM-CC protocols are often used for session setup and session management. These protocols can also be used for the query bandwidth and reclaim bandwidth messages described above. Alternatively, XML over HTTP may also be used.

Figure 6:
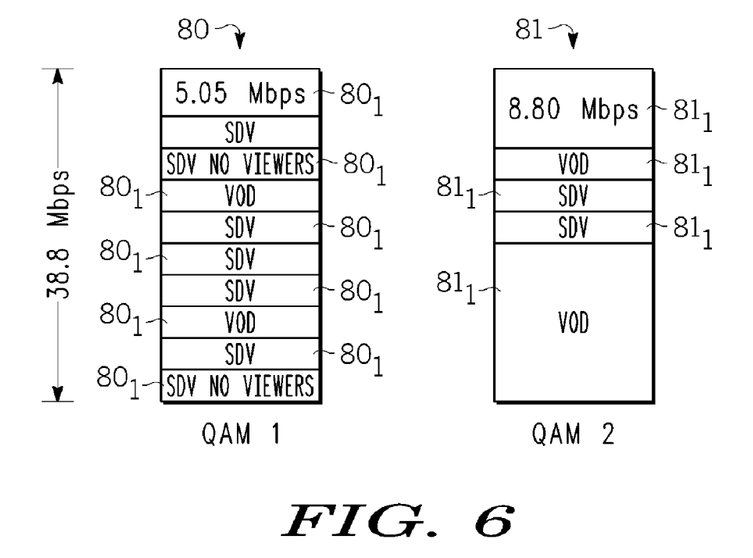
FIG. 6 shows one example of how bandwidth may be allocated between two edge devices prior to bandwidth reclamation.

An example of the bandwidth reallocation process will now be presented. In this simple example, two QAM edge devices are used to deliver both SDV and VOD sessions in a particular service group. The allocation of bandwidth between the two QAMS 80 and 81 is shown in FIG. 6. Standard definition sessions are assumed to use 3.75 Mbps while HD sessions are assumed to use 15 Mbps. The edge resource manager receives a request for a new HD VOD session that will require 15 Mbps. Since no QAM has sufficient bandwidth, the edge resource manager sends a Query Bandwidth Request to both the VOD and SDV session managers. As shown in Table 1, the Query Bandwidth Request includes the amount of bandwidth currently available (i.e., unused) on each edge device and the amount of bandwidth that would need to be reclaimed from each edge device in order to make available the requested 15 Mbps of bandwidth.

TABLE 1

Example Query Bandwidth Request from Edge Resource Manager

| QAM | BW to Reclaim | Available BW |
| --- | --- | --- |
| QAM 1 | 9.95 Mbps | 5.05 Mbps |
| QAM 2 | 6.20 Mbps | 8.80 Mbps |

As FIG. 6 indicates, the VOD session manager cannot free sufficient bandwidth by moving VOD sessions between the two QAMs. However, the SDV session manager can remove the SDV sessions that have no viewers from QAM 1 and move one SDV session from QAM 1 to QAM 2. The Query Bandwidth Response data from each of the session managers is shown in Table 2.

TABLE 2

Example Query Bandwidth Response from SDV Session Manager

| Session Manager | QAM | Bandwidth | Impacted Service Count |
| --- | --- | --- | --- |
| VOD Session Manager | none | N/A | N/A |
| SDV Session Manager | QAM 1 | 11.25 Mbps | 1 |

Figure 7:
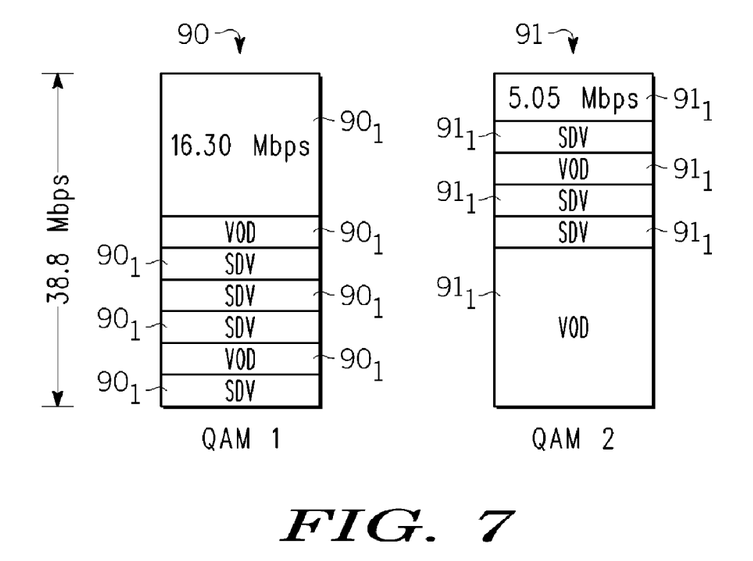
FIG. 7 shows one example of how bandwidth may be reallocated between the two edge devices of FIG. 6 after bandwidth reclamation.

Based on the Query Bandwidth Responses that it receives, the edge resource manager sends a Reclaim Bandwidth Request to the SDV session manager. The SDV session manager acknowledges the request by returning a Reclaim Bandwidth Response to the edge resource manager and executing the session release and session relocation tasks. FIG. 7 shows the bandwidth allocation across the two QAMs 90 and 91 after the bandwidth reclamation process is performed but before the new HD VOD session has been setup. Each bandwidth portion $90_1$-$91_1$ represents a different session that is supported by the QAMs 90 and 91, respectively.

Figure 8:
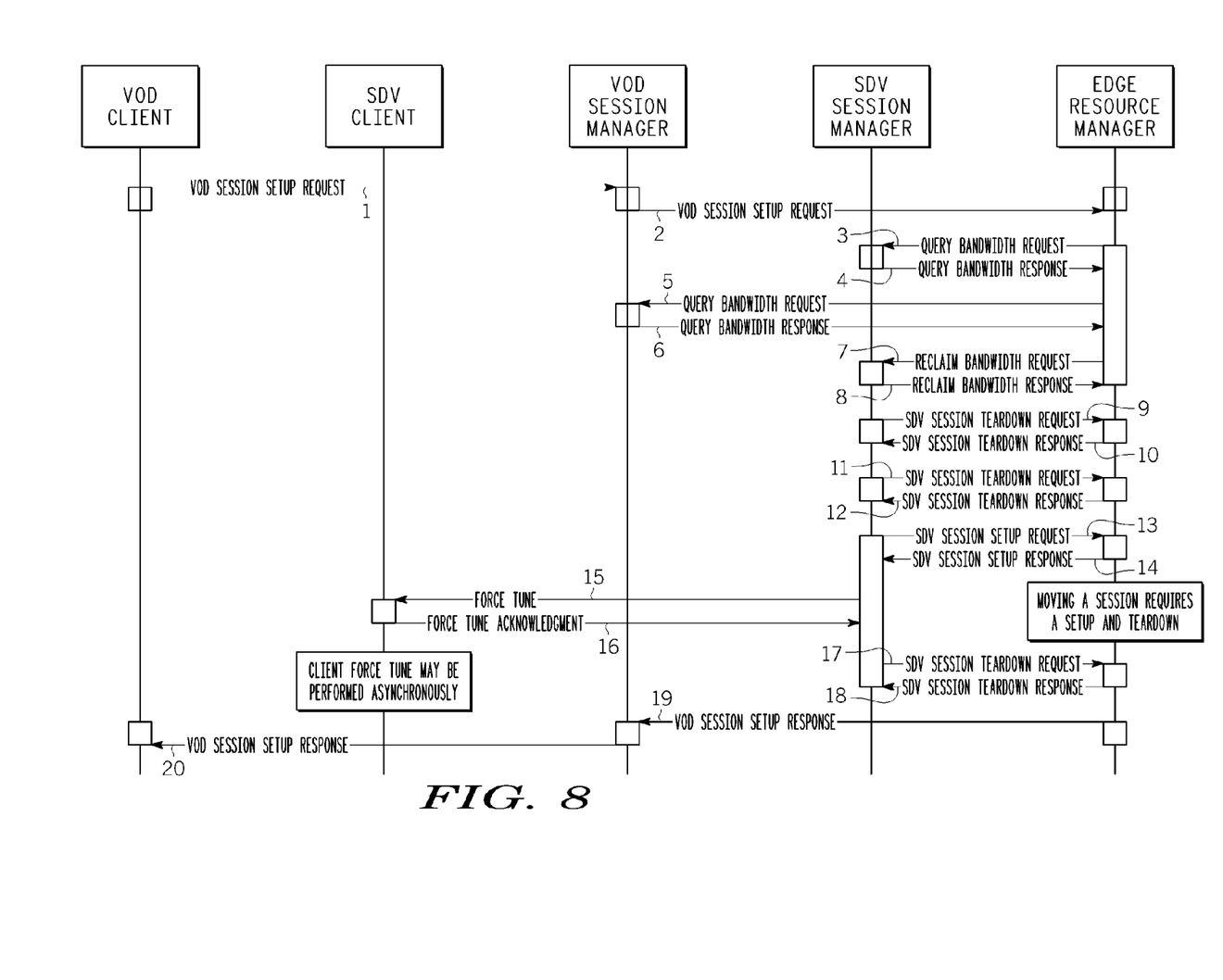
FIG. 8 is a message flow diagram illustrating one example of a bandwidth reclamation process that begins when a subscriber requests a VOD session.

FIG. 8 is a message flow diagram illustrating one example of a bandwidth reclamation process that begins when a subscriber requests a VOD session. At 1, the VOD client (e.g., a VOD application residing in a set top terminal) sends a message to the VOD session manager. The VOD session manager, in turn, sends a VOD session setup request to the edge resource manager at 2. The edge resource manager determines that there is an insufficient amount of bandwidth available to establish the VOD session without defragmenting the sessions currently being delivered by the edge devices. Accordingly, the edge resource manager sequentially sends query bandwidth requests to the various session managers. Specifically, the edge resource manager first sends a query bandwidth request to the SDV session manager at 3 and the SDV session manager replies by sending a query bandwidth response at 4. Likewise, the edge resource manager sends a query bandwidth request to the VOD session manager at 5 and the VOD session manager replies by sending a query bandwidth response at 6.

After receiving the query bandwidth response from both the VOD and SDV session managers, the edge resource manager determines the appropriate session manager that should relocate and/or release currently active sessions. Of course, in some cases the edge resource manager may request both session managers to relocate and/or release currently active sessions. In this example, however, the edge resource manager selects the SDV session manager, which can make the requested bandwidth available by releasing two active sessions that are not being viewed by any subscribers and by moving one additional active session that is being viewed by one or more subscribers. Accordingly, the edge resource manager sends a reclaim bandwidth request at 7 and the SDV session manager confirms the request by sending a reclaim bandwidth response at 8.

The SDV session manager implements the defragmentation process by sending a SDV session teardown request to the edge resource manager at 9, which directs the edge resource manager to teardown one of the SDV sessions that are not being actively viewed. The edge resource manager performs the requested action by proper control of the edge devices and sends an SDV session teardown response to the SDV session manager at 10 confirming that the session has been released. Next, the SDV session manager sends a second SDV session teardown request to the edge resource manager at 11, which directs the edge resource manager to teardown the other SDV session that is not being actively viewed. The edge resource manager performs the requested action and sends a second SDV session teardown response to the SDV session manager at 12 confirming that the session has been released.

The SDV session manager next begins the process of relocating a session currently being viewed by sending the edge resource manager at 13 an SDV session setup request in order to establish the relocated session on a different edge device. In response, the edge resource manager establishes a new session, which effectively relocates the desired session. The edge resource manager sends a confirmation back to the SDV session manager at 14. Once the SDV session manager has received the request, it sends a force tune to the SDV client at 15. The force tune requests the SDV client to tune to a channel corresponding to the session's new frequency and program number. The SDV client performs the force tune and sends an acknowledgement back to the SDV session manager at 16. Once the SDV client has tuned to the relocated session, the original session undergoes a teardown process to make bandwidth available for the VOD session that is being established. The teardown process begins when the SDV session manager sends an SDV session teardown request to the edge resource manager at 17. The edge resource manager performs the requested action and sends a confirmation back to the SDV session manager at 18, thereby completing the defragmentation process. Finally, now that the bandwidth has been made available for the VOD session, the edge resource manager can fulfill the VOD session setup request that was received from the VOD session manager at 2. The edge resource manager confirms to the VOD session manager that the VOD session has been setup by sending a VOD session setup response at 19. The VOD session manager notifies the VOD client at 20 that the VOD session has been established.

In the example presented in FIG. 8 the sessions that were released or moved were all under the control of a single session manager, specifically, the SDV session manager. More generally, however, the edge resource manager can request multiple session managers to contribute to the bandwidth reclamation process. In some cases this may only be used when the edge resource manager must reactively reclaim bandwidth on an edge device in order to establish a new session.

When multiple session managers are involved in reclaiming bandwidth, each session manager, in the Query Bandwidth Request, returns a list of the amount of bandwidth that can be released per edge device and the number of sessions and the amount of bandwidth that needs to be relocated for that edge device. The edge resource manager then combines the information to come up with a sum of the bandwidth that can be reclaimed per edge device and the impact to existing sessions. The edge resource manager selects the edge device that frees a sufficient amount of bandwidth to establish the new session yet relocates the fewest number of existing sessions. The edge resource manager then sends a Reclaim Bandwidth Request to all the session managers that need to be involved with the bandwidth reclamation process on the selected edge device.

Figure 9:
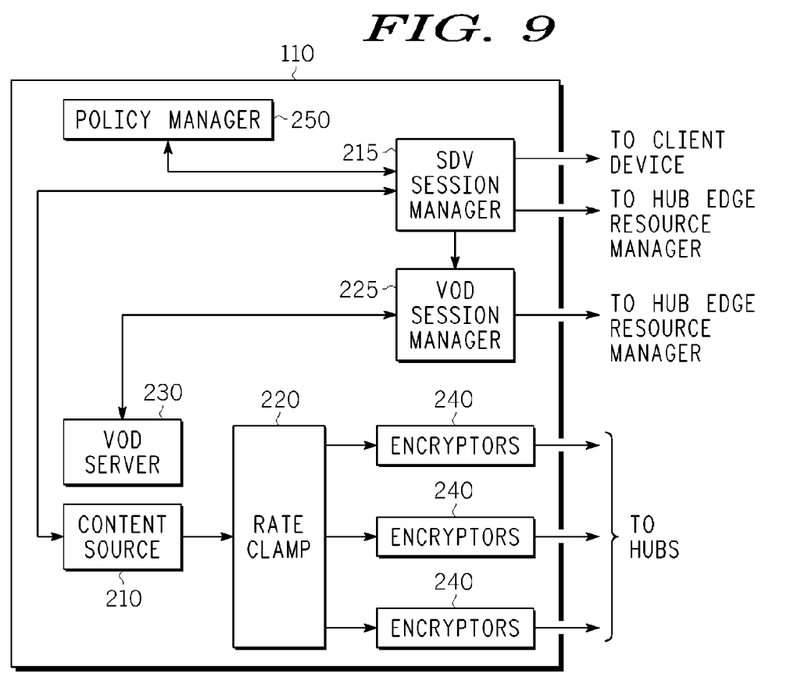
FIG. 9 shows another example of the headend that employs a policy manager.

As discussed so far, the bandwidth reclamation process has not removed any sessions that were being actively used by customers. However, it is possible to define business rules and policies that specify when certain services have a higher priority than other services. In such cases, the bandwidth reclamation process may cause lower priority sessions to be terminated in favor of a new higher priority session. For instance, as shown in FIG. 9, a policy manager 250 may be employed in the headend 110 to assign priorities by service type (VOD, SDV, CMTS, etc.), service subtypes (VOD free on demand, VOD paid, subscription VOD, free SDV, paid tier SDV, etc.), and subscribers (business versus residential, power users versus basic customers, etc.). In FIGS. 2 and 9, like elements are denoted by like reference numerals. The policy manager 250 allows an operator to specify business rules that indicate when one session has a higher priority than another session, thus allowing a session manager to terminate one session in favor of another.

The policy manager 250 may push policy information to the session managers or it may support a real time policy request from the session managers when determining whether to tear down any lower priority sessions.

If the policy that is employed is based on the service type, service subtype, and subscriber information, the edge resource manager must include this information in the Query Bandwidth Request message sent to the session managers. This allows a session manager to use the policy data to determine whether the new session request has a higher priority than any existing sessions being delivered by the edge devices assigned to this service group. In response to the Query Bandwidth Request, the session managers attempt to reclaim bandwidth on an edge device in the manner described above. However, if sufficient bandwidth cannot be released by removing unused sessions and relocating sessions, the session manager will consult the policy manager to determine whether to terminate any existing sessions so that the new session request can be serviced. The Query Bandwidth Response sent back to the edge resource manager will include the number of services that will be torn down to support the new session request. The edge resource manager will then choose to reclaim bandwidth by selecting the option that least impacts existing sessions.

The processes described above, including but not limited to those presented in connection with FIGS. 5 and 8, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus has been described for more efficiently allocating the available bandwidth that a series of edge devices makes available to subscribers in a service group. In particular, the session managers and the edge resource manager act in cooperation with one another to release, degrade, or relocate one or more active sessions that are being delivered to subscribers by the edge devices in order to defragment the bandwidth made available by the edge devices. In this way unused bandwidth that is distributed over two or more of the edge devices can be aggregated into a single block on a single edge device so that it can be used to support the establishment of additional services or sessions.

The invention claimed is:
1. A method for reclaiming bandwidth from an edge device, comprising:
communicating a bandwidth query message to at least one session manager, the bandwidth query message specifying an amount of bandwidth that needs to be reclaimed from a single one of a plurality of edge devices in order to establish at least one additional session that delivers a digital service to a subscriber in a service group serviced by the plurality of edge devices over an access network;

in response to communication of the bandwidth query message, receiving a bandwidth query response message from the session manager identifying an edge device from the plurality of edge devices from which at least the specified amount of bandwidth can be reclaimed; and communicating a response to the session manager requesting the session manager to reclaim the specified amount of bandwidth from the edge device that has been identified.

2. The method of claim 1 wherein the bandwidth query response message identifies a number of active sessions currently being delivered to the service group that need to be relocated from one or more of the edge devices to another edge device in order to reclaim the specified amount of bandwidth from the edge device that has been identified.

3. The method of claim 1 wherein the bandwidth query response message identifies a number of active sessions that can be released to thereby reclaim all bandwidth from each session.

4. The method of claim 1 wherein the at least one session manager includes a plurality of session managers each associated with a different digital service and further comprising:

communicating a bandwidth query message to each of the session managers;

receiving a bandwidth query response from each of the session managers, at least two of the bandwidth query messages indicating that the specified amount of bandwidth can be reclaimed from an edge device;

selecting one of the session managers in accordance with a predefined policy; and communicating a response to the selected session manager requesting the selected session manager to reclaim the specified amount of bandwidth from the edge device that has been identified by the selected session manager.

5. The method of claim 4 wherein selecting one of the session managers includes selecting a plurality of session managers in accordance with the predefined policy and further comprising communicating a response to the plurality of selected session managers requesting the selected session managers to reclaim the specified amount of bandwidth from a common edge device that has been identified by each of the selected session managers.

6. The method of claim 4 wherein the predefined policy requires selecting a session manager that needs to relocate a fewest number of active sessions in order to reclaim the specified amount of bandwidth.

7. The method of claim 4 wherein the predefined policy is based on service or subscriber type.

8. The method of claim 1 wherein the bandwidth query message includes an identification of an amount of currently available bandwidth on each of the plurality of edge devices.

9. The method of claim 1 further comprising generating and communicating the bandwidth query message in response to a session setup request received from a session manager.

10. At least one non-transitory computer-readable medium encoded with instructions which, when executed by a processor, performs a method including:

receiving a bandwidth query message from an edge resource manager, the bandwidth query message specifying an amount of bandwidth that needs to be reclaimed from a single one of a plurality of edge devices in order to establish at least one additional session that delivers a digital service to a subscriber in a service group serviced by the plurality of edge devices over an access network, wherein the edge resource manager allocates bandwidth offered by each of the plurality of edge devices;

in response to receipt of the bandwidth query message, examining each of the plurality of edge devices to determine if the specified amount of bandwidth can be reclaimed from one of the edge devices by releasing or degrading one or more sessions or by relocating one or more sessions from one of the edge devices to another edge device; and communicating a bandwidth query response to the edge resource manager identifying an edge device from which at least the specified amount of bandwidth can be reclaimed.

11. The computer-readable medium of claim 10 further comprising:

receiving a response from the edge resource manager requesting the specified amount of bandwidth to be reclaimed from the edge device that has been identified; and reclaiming the specified amount of bandwidth from the edge device that has been identified in accordance with the request.

12. The computer-readable medium of claim 10 wherein the bandwidth query response message identifies a number of active sessions currently being delivered to the service group that need to be released or relocated from one or more of the edge devices to another edge device in order to reclaim the specified amount of bandwidth from the edge device that has been identified.

13. The computer-readable medium of claim 10 further comprising receiving policy information prioritizing different types of sessions, wherein the specified amount of bandwidth that can be reclaimed from one of the edge devices is determined at least in part based on the policy information.

14. The computer-readable medium of claim 13 wherein the different types of sessions are prioritized based on service type and/or subscriber type.

15. A content delivery system, comprising:

at least one session manager for coordinating delivery of a digital service to subscriber terminals;

a plurality of edge devices for delivering the digital service over an access network to subscriber terminals in a service group;

an edge resource manager for allocating bandwidth offered by the edge devices for establishment of sessions in which the digital service is delivered to individual ones of the subscribers by one of the edge devices, wherein the edge resource manager is requested to establish the sessions by the session manager; and wherein the edge resource manager and the session manager are configured to communicate with one another in order to defragment the bandwidth offered by the edge devices so that at least one single block of bandwidth is made available on a single one of the edge devices for the purpose of establishing at least one additional session.

16. The content delivery system of claim 15 wherein at least one of the edge devices is a QAM modulator.

17. The content delivery system of claim 15 wherein the edge resource manager is further configured to generate a bandwidth query message that is communicated to the session manager, the bandwidth query message specifying an amount of bandwidth that needs to be reclaimed from a single one of a plurality of edge devices in order to establish the at least one additional session.

18. The content delivery system of claim 17 wherein the session manager is further configured to generate a bandwidth query response message in response to receipt of the bandwidth query message, the bandwidth query response message identifying an edge device from which at least the specified amount of bandwidth can be reclaimed.

19. The content delivery system of claim 18 wherein the at least one session manager comprises a plurality of session managers each associated with a different digital service, and wherein the edge resource manager is further configured to identify, from a bandwidth query response message received from each of the plurality of session managers, one or more of the session managers from which the specified amount of bandwidth is to be reclaimed.

20. The content delivery system of claim 19 wherein the edge resource manager is further configured to identify the one or more of the session managers from which the specified amount of bandwidth is to be reclaimed in accordance with a policy that requires a fewest number of active session to be relocated from one edge device to another edge device.

* * * * *